US011980916B2

(12) United States Patent
Carrasco

(10) Patent No.: US 11,980,916 B2
(45) Date of Patent: May 14, 2024

(54) SCREENING TOOL AND SCREENING DEVICE

(71) Applicant: A O IDEAS GMBH, Schocherswil (CH)

(72) Inventor: César Carrasco, Schocherswil (CH)

(73) Assignee: A O IDEAS GMBH, Schocherswil (CH)

(*) Notice: Subject to any disclaimer, the term of this patent is extended or adjusted under 35 U.S.C. 154(b) by 0 days.

(21) Appl. No.: 18/036,206

(22) PCT Filed: Nov. 18, 2021

(86) PCT No.: PCT/EP2021/082184
§ 371 (c)(1),
(2) Date: May 10, 2023

(87) PCT Pub. No.: WO2022/106558
PCT Pub. Date: May 27, 2022

(65) Prior Publication Data

US 2023/0415199 A1 Dec. 28, 2023

(30) Foreign Application Priority Data

Nov. 20, 2020 (EP) .................................... 20209093
Mar. 12, 2021 (EP) .................................... 21162464

(51) Int. Cl.
*B07B 1/28* (2006.01)
*B07B 1/46* (2006.01)

(52) U.S. Cl.
CPC .............. *B07B 1/28* (2013.01); *B07B 1/4663* (2013.01); *B07B 1/469* (2013.01)

(58) Field of Classification Search
CPC .......... B07B 1/28; B07B 1/4663; B07B 1/469
See application file for complete search history.

(56) References Cited

U.S. PATENT DOCUMENTS 2,315,651 A 4/1943 Peterson
4,062,768 A * 12/1977 Elliot ........................ B07B 1/42
209/365.2

(Continued)

FOREIGN PATENT DOCUMENTS

DE 44 18 175 A1 12/1994
DE 19923783 A1 * 11/2000 .............. B07B 1/42

(Continued)

OTHER PUBLICATIONS

Mar. 10, 2022 International Search Report issued in International Patent Application No. PCT/EP2021/082184.

(Continued)

*Primary Examiner* — Michael McCullough
*Assistant Examiner* — Kalyanavenkateshware Kumar
(74) *Attorney, Agent, or Firm* — Oliff PLC

(57) ABSTRACT

A screening tool includes at least a first screen lining which is coupled to a metal coupling element to which an ultrasonic transducer is connected which is connected by electrical lines to an ultrasonic generator. The screening tool includes a metal work plate which has a connection region and at least one first transfer region with first transfer openings, which first transfer region forms the first screen lining through which particles of the process material which are larger than the transfer openings can pass, from particles of the process material smaller than the transfer openings, wherein the coupling element is a curved or straight rod having a first end piece welded to the connection region and a second end piece mechanically connected to the ultrasonic transducer. The screening device includes one or more such screening tools and a control unit by means of which the ultrasonic generator is controllable.

17 Claims, 11 Drawing Sheets

(56) References Cited

U.S. PATENT DOCUMENTS

Figure 1:
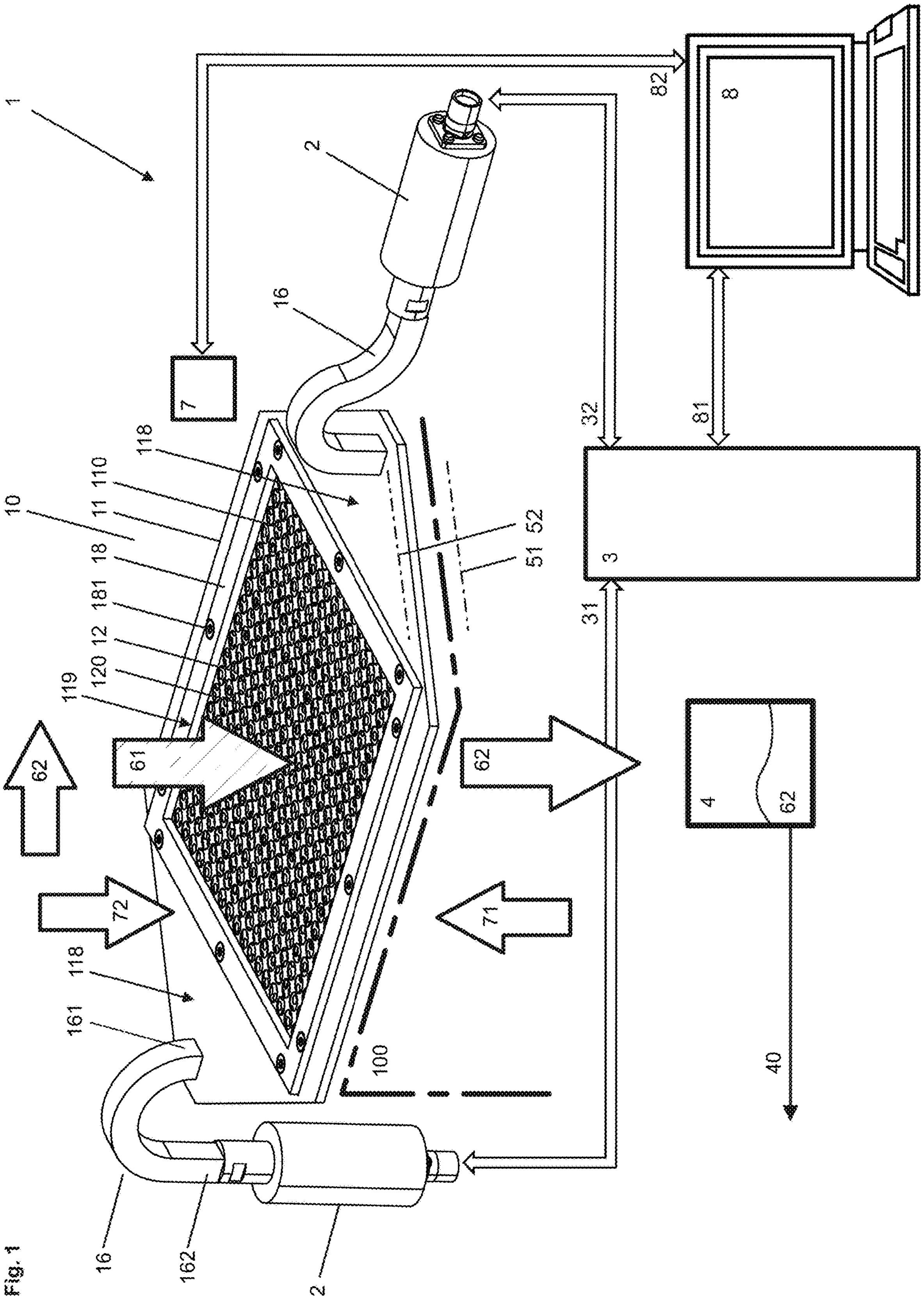

| | | | | |
|---|---|---|---|---|
| 5,226,546 A | 7/1993 | Janssens et al. | | |
| 5,799,799 A * | 9/1998 | Alamzad | B07B 1/42 209/381 | |
| 6,938,778 B2 * | 9/2005 | Allaei | B07B 1/50 209/379 | |
| 2002/0117940 A1 * | 8/2002 | Allaei | B07B 1/42 310/328 | |
| 2006/0043006 A1 | 3/2006 | Garrett et al. | | |
| 2012/0234735 A1 | 9/2012 | Ichikawa et al. | | |
| 2016/0368023 A1 | 12/2016 | Tüshaus et al. | | |
| 2020/0061673 A1 | 2/2020 | Carrasco | | |

FOREIGN PATENT DOCUMENTS

| | | |
|---|---|---|
| DE | 10 2015 114 076 B3 | 5/2016 |
| FR | 2 809 640 A1 | 12/2001 |
| JP | 2011-245446 A | 12/2011 |
| WO | 2018/219840 A1 | 12/2018 |

OTHER PUBLICATIONS

Mar. 10, 2022 Written Opinion issued in International Patent Application No. PCT/EP2021/082184.

* cited by examiner

SCREENING TOOL AND SCREENING DEVICE

The invention relates to a screening tool for working a process material by using ultrasound and to a screening device with at least one such screening tool.

Screening devices that serve to divide a process material, e.g., a mixture of solids, into fractions with different grain sizes are used, for example, in raw material processing, the food industry, the chemical industry and the building materials industry.

According to https://en.wikipedia.org/wiki/Sieve, a screening device comprises a screen lining that contains a large number of equally sized openings as a separating medium. The screen lining consists of either metal (perforated sheet, wire mesh, metal grid or metal rods), plastic, rubber of various hardnesses or silk gauze. The size of the openings is called the mesh size and defines the sieve cut. Larger grains remain above the openings (sieve overflow), smaller grains fall down (sieve passage). A grain that is approximately of the same size as the mesh size is called a boundary grain. A screen can consist of one or more superimposed screen linings, with the screen lining with the largest mesh size at the top of the screen stack. The cleanliness of the screen lining is important for the efficiency of a sieve. In particular, the clogging of the screen openings by boundary grain must be prevented by suitable measures (e.g., brushes, balls, chains, rubber cubes that "run" on or under the screen or by increasing the hole diameter downwards, as in the case of for example conically or double cylindrically drilled holes).

WO2018219840A1 discloses a screening device with a screening tool that has a screen frame which holds a screen lining. To improve the screening performance, ultrasonic energy is coupled into the screen frame, which is distributed from the screen frame to the screen lining.

This arrangement has significant disadvantages. The screen lining is usually firmly connected to the screen frame, welded or glued, and can only be replaced at great expense, i.e., together with the entire screen frame, if defects occur.

Due to the peripheral coupling of ultrasonic energy, there is an uneven distribution of ultrasonic energy on the screen lining and often an undesirable heating of the screen lining or parts of it, which can lead to considerable mechanical and thermal stress. Due to the peripheral coupling of the ultrasonic energy, temperatures occur in the coupling zone of the screen lining and in the central area of the screen lining at its elements, which differ significantly and can cause high mechanical stresses. The punctual occurrence of high temperatures can cause damage to the screen lining, its periphery or its working area, e.g., at joints or on individual wires of the wire mesh.

In addition to thermal material damage due to melting, further material damage can occur due to mechanical stress. Mechanical stresses can cause parts of the screen lining or wire mesh to tear, which is why the screening tool must be replaced at corresponding expense.

It is also important to note that the process material can be heated to an inadmissibly high temperature at certain points. Pharmaceutical powders or even foodstuffs in powder form can be structurally altered by heating and lose the required properties. Partial damage, on the other hand, may mean that the entire processed material can no longer be used.

DE102015114076B3 discloses another screening device comprising a screen frame provided with a screen lining and connected to a vibration generator.

JP2011245446A discloses a screening device having an outer mounting frame in which a screen lining is disposed on a metal plate having a plurality of arms extending from an outer frame to a center piece. The lower side of the center piece is coupled with an ultrasonic transducer, by means of which ultrasonic energy is transmitted via the center piece to the arms. This device has the disadvantage that the screen lining is partially covered by the metal plate, which is why the process material can pass through the screen lining in this area. In addition, the coupling still occurs at the edge of parts of the screen lining, which is why the coupling is still not optimal.

US2012234735A1 discloses a screening device for apparatuses in which image information is visualised using toner. By means of the screening device, larger toner particles are separated so that an image can be precisely realised by means of the small toner particles. For this purpose, the screening device has a cylindrical body with a filter on its underside. Above the filter, a blade is rotatably mounted by means of which the toner is whirled up. This device has the disadvantage that a complex mechanical device is required to keep larger toner particles away from the filter. The throughput of toner material through the filter, however, is hardly improved by means of the rotatably mounted blade.

U.S. Pat. No. 2,315,651A discloses a screening device with two screen plates which are provided with screen openings and can be displaced and fixed relative to one another. By mutual displacement of the screen plates, the size of the openings of the resulting screen lining can be adjusted. However, the sieve passage through the sieve device, however, is not improved.

US2006043006A1 discloses a screening device with a screen frame which is mounted on a base and which holds a screen lining, with a vibrator which moves the screen frame relative to the base, with a guide part above the screen lining, by means of which the flow of the material to be screened is controlled, and with a further vibration source, by means of which kinetic energy, optionally ultrasonic energy, is transmitted to the guide part in order to prevent blockage of the openings of the screen lining. The guide part, which can be of circular or spiral shape, is preferably in contact with the screen lining. This screening device also has the disadvantage that the cross-section of the screen lining is reduced by the guide part and the transfer of kinetic energy to the screen lining is not optimal.

U.S. Pat. No. 5,226,546A discloses a screening device having a screen lining supported on a base by springs and connected to a motor housing in which a vibrator is provided with a motor having a drive shaft on which weights are eccentrically mounted. Rotation of the drive shaft causes the screen housing, in which a screen lining is arranged, to vibrate. This screening device has a complex design and does not allow optimizing the screen passage.

The present invention is therefore based on the object of providing an improved screening tool using ultrasonic energy and a screening device comprising such a screening tool.

The screening device shall be of simple design and be producible with reduced costs and at the same time provide improved working results.

The screening device shall allow a product or process material to be efficiently processed, screened or mixed or dosed or modified by the action of other mediums.

The screening device shall require as little or no maintenance as possible. If maintenance of the screening device is required, this shall be carried out quickly with little effort, so that only low maintenance costs and downtimes result for the screening device.

Furthermore, the screening device shall be adaptable to changed work processes quickly and with minimal effort.

The screening tool shall ensure efficient processing of the process material so that the process material or the processed product can be optimally screened or mixed or dosed or otherwise modified.

When screening process material, an increased material throughput shall be achieved. Furthermore, it shall be possible to precisely mix or dose process material even in very small quantities. If other processing of the process material is intended, particles of the process material shall be reliably separated and processed, e.g., with other mediums.

The screening tool shall ensure an optimal transfer of ultrasonic energy to the screen lining and the process material. Thermal and mechanical overloads of the screening tool or parts of it shall be avoided as well as an inadmissible heating of the process material or of the processed product.

The screening tool shall operate largely maintenance-free. If, however, maintenance should become necessary, possibly the replacement of a screen lining, it should be possible to carry out the maintenance work quickly and with a minimum of effort.

With a single screening tool, it should also be possible to support different work processes simultaneously, e.g., to carry out more than one screening process at the same time. By means of the screening device, it shall thus be possible to carry out one screening process or several screening processes, which are preferably individually controllable.

This task is solved with a screening tool and a screening device which comprise the features specified in claims 1 and 7, respectively. Advantageous embodiments of the invention are defined in further claims.

The screening tool which is provided for working of a process material comprises at least one first screen lining which is coupled to a metal coupling element to which an ultrasonic transducer is connected which is connected by electrical lines to an ultrasonic generator. Process materials are, for example, materials from the chemical industry, the pharmaceutical industry or the food industry. Process materials typically include powders or granules and possibly other components to be separated into a screen passage and a screen overflow. The screen passage consists of the powder or granulate and any other components that pass through the first screen lining. The screen overflow that does not pass through the screen lining is led away.

According to the invention, the screening tool comprises a metal work plate having a connection region and at least one transfer region with first transfer openings, which transfer region forms the first screen lining through which particles of the process material which are larger than the transfer openings are separable from particles of the process material which are smaller than the transfer openings, wherein the coupling element is a curved or straight rod having a first end piece which is welded to the connection region and a second end piece which is mechanically connected to the ultrasonic transducer. The screening device comprises one or more such screening tools and preferably a control unit by means of which the ultrasonic generator is controllable.

The screening tool thus comprises a metal work plate with an integral screen lining into which ultrasonic energy can be directly coupled and a coupling element which is welded to the work plate with a first end piece and mechanically connected to an ultrasonic transducer with a second end piece. Between the welded coupling element or the welded coupling elements and the screen lining or all elements of the screen lining, there are no further transitions, such as clamping points, welding points, adhesive points and the like provided peripherally on the screen lining, which the inflowing ultrasonic energy must overcome. By avoiding such transitions, energy losses and heating that can occur at such transitions are avoided.

Thus, there are no energy losses at junctions, which require a higher input of ultrasonic energy, which in turn leads to increased energy losses and increased heating. Since energy losses are avoided, the inventive screening tool operates with increased efficiency and requires less ultrasonic energy, further reducing losses and heating that occur at the weld of the coupling element. The welding point connecting the coupling element to the work plate is therefore less stressed.

Since increased heating of the screen lining, particularly punctual increased heating or so-called hotspots within or at the periphery of the screen lining are eliminated, thermal expansion within the screen lining, which could lead to mechanical damage to the screening tool or parts thereof, is also avoided. Inventive screening tools can therefore be operated largely wear-free and maintenance-free.

Since there is no increased heating of the screen lining and no increased heating at specific points, there are no adverse effects on the processed material.

Since heating and hotspots in the screening tool are largely avoided when ultrasonic energy is injected, the screening tool also allows the injection of increased ultrasonic energy in order to process material that cannot be processed efficiently with conventional screening tools. The inventive screening tool can therefore be operated with low amounts of energy or also with very high amounts of energy, and thus has a high dynamic.

It is particularly important that the optimally coupled ultrasonic energy is distributed evenly over the entire work plate and thus over the entire screen lining. The material separation therefore takes place optimally over the entire cross-section of the screen lining.

When processing, in particular screening process material, due to the high efficiency of the screening tool, an increased throughput of process material is achieved, which is fed into the screening tool and removed from it again during the processing process. The process material does not necessarily have to pass through the screen lining. Instead, a medium that serves to process the process material can be guided through the screen lining. For example, the process material is kept separated above the screen lining under the influence of ultrasonic energy, while a medium is guided through the screen lining of the screening tool, by means of which the separated particles of the process material are impacted. For example, air, gas, moisture, steam or a powdery process material is fed through the first screening tool or a further screening tool. During processing, the particles of the process material are e.g., coated and/or changed in structure and/or compacted and/or coupled with further particles of the process material or of the supplied powder.

The use of the correspondingly stable work plate also allows the screening tool to be advantageously coupled with at least one further tool or a working unit by means of which the process material can be pre-processed or post-processed. For example, a working unit is provided by means of which the process material can be conveyed and/or mixed and/or separated and/or swirled and/or mixed or impacted with a further material component. The working unit is in particular a tool unit provided with one or more tools.

The working unit can have moving parts and/or non-moving parts. Preferably, a drive motor is provided by means of which moving parts can be driven. For example, on one side of the work plate of the screening tool at least one rotor is provided, by means of which supplied process material can be split up and/or swirled and/or guided or pressed against the work plate. On the other side, a rotor can be provided by means of which the process material passed through the screen lining is swirled so that it can be discharged evenly distributed.

Preferably, the work plate has at least one mounting part by means of which the at least one additional working unit can be held. The stable work plate serves on the one hand as a screen lining and on the other hand as a base plate for the connection with further tools.

In a preferred embodiment, the work plate comprises an opening or bearing opening in which a rotor shaft is guided through and preferably mounted or held, for example, by means of a bearing bush, so that at least one rotor above the work plate and/or at least one rotor below the work plate can be driven by means of the rotor shaft.

The screening tool can be adapted in its dimensions and the structure of the screen lining to the present processes and process materials. In the pharmaceutical industry, for example, small quantities of a process material can be processed with screening tools with correspondingly small dimensions, e.g., with screen lining surfaces in the range of only 1 $cm^2$. In the food industry, screen linings with surfaces in the range of several square metres can be used. For example, the work plate has a thickness in the range of 0.5 mm-20 mm, more preferably in the range of 1 mm-5 mm and a surface area in the range of 1 cm2-16 m2.

In preferred embodiments, the coupling element or work plate is curved in its connection region or transfer region. Preferably, the coupling element and the connection region are curved. In this way, an optimal coupling of ultrasonic energy into the transfer region of the work plate is achieved. The transfer region can also have a surface waviness which, with an appropriately selected frequency of the ultrasonic energy and with a given particle size of the process material, produces improved working results, in particular an optimal separation of the particles of the process material.

The work plate and the at least one coupling element are preferably made of the same material. For the production of the screening tool, preferably high-quality metals such as stainless steel, chrome steel, aluminium, copper or titanium are used.

In preferred embodiments, at least one second screen lining is arranged on the upper side of the work plate and/or on the lower side of the work plate. For example, a second, third or further screen lining in the form of a wire mesh or a perforated plate is placed on the work plate. Typically, the transfer openings, mesh openings or hole openings of this at least one second screen lining are smaller than the transfer openings of the work plate. Second and further screen linings made of metal are particularly preferred. However, screen linings made of plastic can also be used.

The use of a further screen lining results in numerous advantages. The second or second and further screen lining is structurally supported by the work plate and therefore does not need to be inherently stable. The screen linings can therefore be manufactured in a simple manner and with minimal effort. For example, wire meshes with thin wires or thin metal plates or foils can be used, which can be manufactured or processed in a simple manner, e.g., by means of punching technology, etching technology or laser technology. The screen coverings can be manufactured at low cost and ideally adapted to the user's processes.

Second or further screen linings can be attached to the screening tool and exchanged with a few simple steps. Adaptation to process changes is possible without replacing the screening tool and only by replacing the second or further screen lining. The screening tool can thus be quickly adapted to any process.

As a consequence, ultrasonic energy is not only coupled into the second or further screen lining peripherally, but evenly over its entire surface. This results in no heating and no hotspots within the additionally applied screen linings. Due to the optimal coupling of ultrasonic energy over the entire surface of the screen lining, optimal working results and only minimal stress on the screen linings result. Due to the optimal coupling of ultrasonic energy, the coupled ultrasonic energy can in turn be reduced. If, on the other hand, the coupling of ultrasonic energy is desired, no heating and no damage to the screen lining will occur due to the optimal coupling.

The coupling of a flexible screen lining to the work plate is preferably done by mounting elements and is supported by the applied process material in the working area. Furthermore, an atmospheric overpressure can be provided on one side, by which the at least one second screen lining is pressed or pulled against the work plate.

Preferably, mounting elements are provided by means of which the at least one second screen lining is pressed against the work plate and, if necessary, tensioned. The mounting elements can be form-fitted or force-fitted to the screening tool or can be connected during the process of mounting the screening tool in the screening device.

Preferably, the work plate has one or more recesses on at least one side, in which the at least one second screen lining or the mounting elements are held. The screening tool can therefore also be designed flat and thin with the equipment of further screen linings and can be used advantageously in any process.

Preferably the at least one second screen lining is held by a mounting frame made of metal or plastic. The mounting frame is connected to the work plate with further mounting elements, such as screws made of metal or plastic or pneumatic elements, such as inflatable tyres. Preferably, a mounting frame made of plastic is used, which is fixed by means of plastic screws. The mounting frame can have any geometric shape, e.g., round or rectangular.

The use of pneumatic elements allows the screening tool to be easily installed and removed, for example to apply a new second or further screen lining.

In preferred embodiments, at least one circumferential embossed or shaped element, such as a circumferential groove or a circumferential ring, is provided on the upper side and/or on the lower side of the work plate. Corresponding to this shaped element, the at least one second screen lining has a shaped or embossed counter element. The form-fitting connection of the form elements and the counter elements ensures that the second or further screen lining is automatically correctly mounted.

In preferred embodiments, it is provided that the second screen lining and at least one third screen lining are preferably identical and displaced relative to each other in such a way that a combined screen lining results. In this way, by displacing the second and third screen linings, a combined screen lining with transfer openings can optionally be created, the dimensions of which are defined by the mutual displacement of the screen linings.

In preferred embodiments, the second screen lining can also be moved relative to the work plate to create a work plate with a combined screen lining.

In further preferred embodiments, the work plate comprises several transfer regions with transfer openings. The transfer regions can have different dimensions and/or the transfer openings can have different dimensions, whereby transfer regions of any size can be provided with transfer openings of any size. The individual transfer regions are preferably separated from each other on the upper side and/or the lower side of the separating plate by separating elements, such as walls, possibly walls of containers or tubes. Each transfer region can also be assigned a tube or a container. With only one screening tool several processes can be served. Each transfer region can be used separately from the other transfer regions within a working process.

A partition wall, a transfer tube or a container can be connected to the single transfer region or to one or more of the transfer regions on the lower side and/or the upper side of the work plate. For example, a transfer tube is connected to one of the transfer regions at the top of the partition plate and a container is provided at the bottom of the transfer region to hold the processed material.

In preferred embodiments, the connection region of the screening tool is inclined relative to the transfer region. The screening tool can therefore be of any design and adapted to the infrastructure of the plant intended for the work process. The connection region can be part of a wall, such as a partition wall or a container wall.

The screening device may comprise one or more sieving tools, each of which is connected to an ultrasonic generator via at least one coupling element and an ultrasonic transducer. The individual ultrasonic transducers are preferably individually controllable so that the sieving tools and parts thereof can be individually adapted to each process stage.

Figure 2:
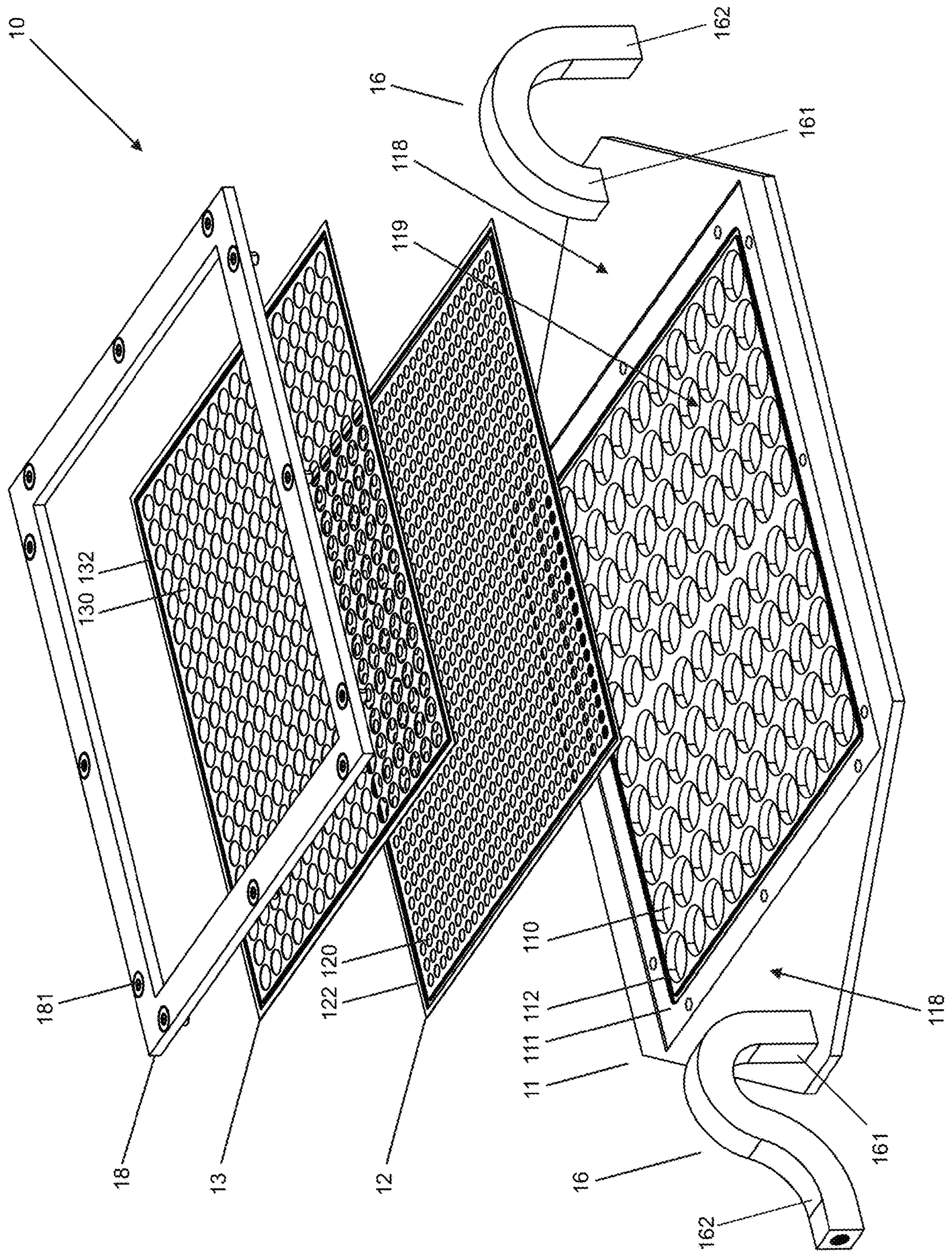
Figure 3:
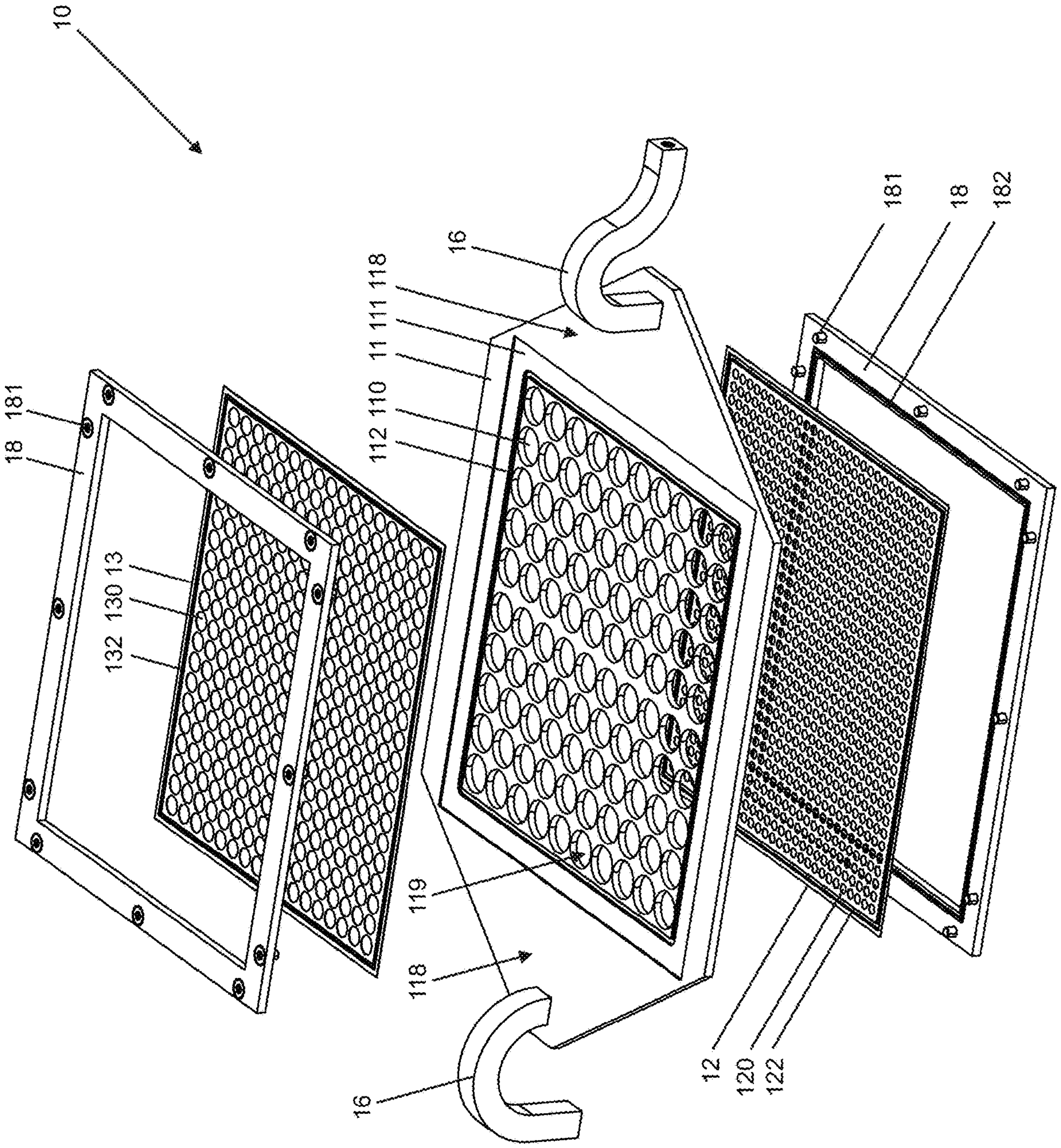
Figures 4A, 4B:
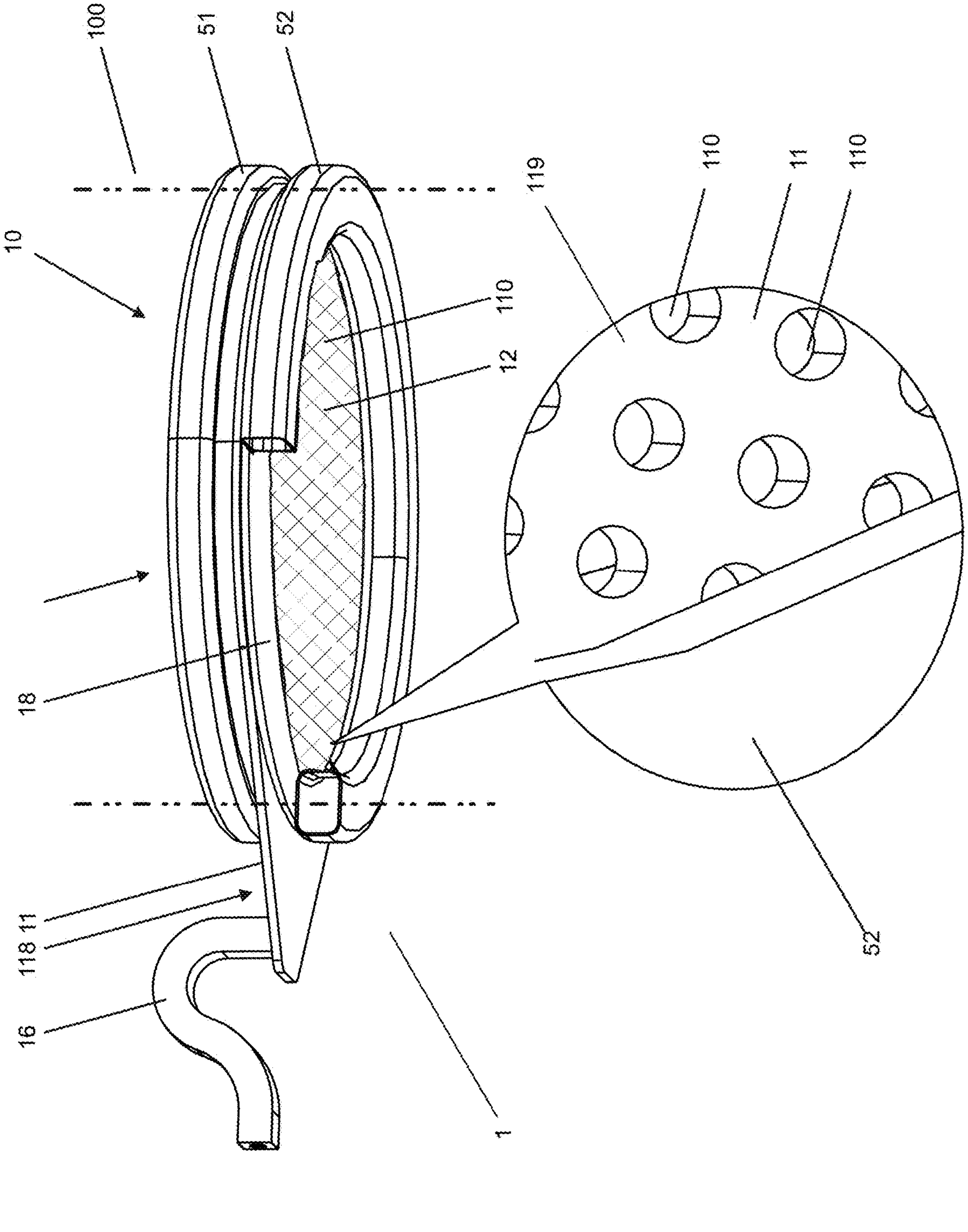
Figure 4C:
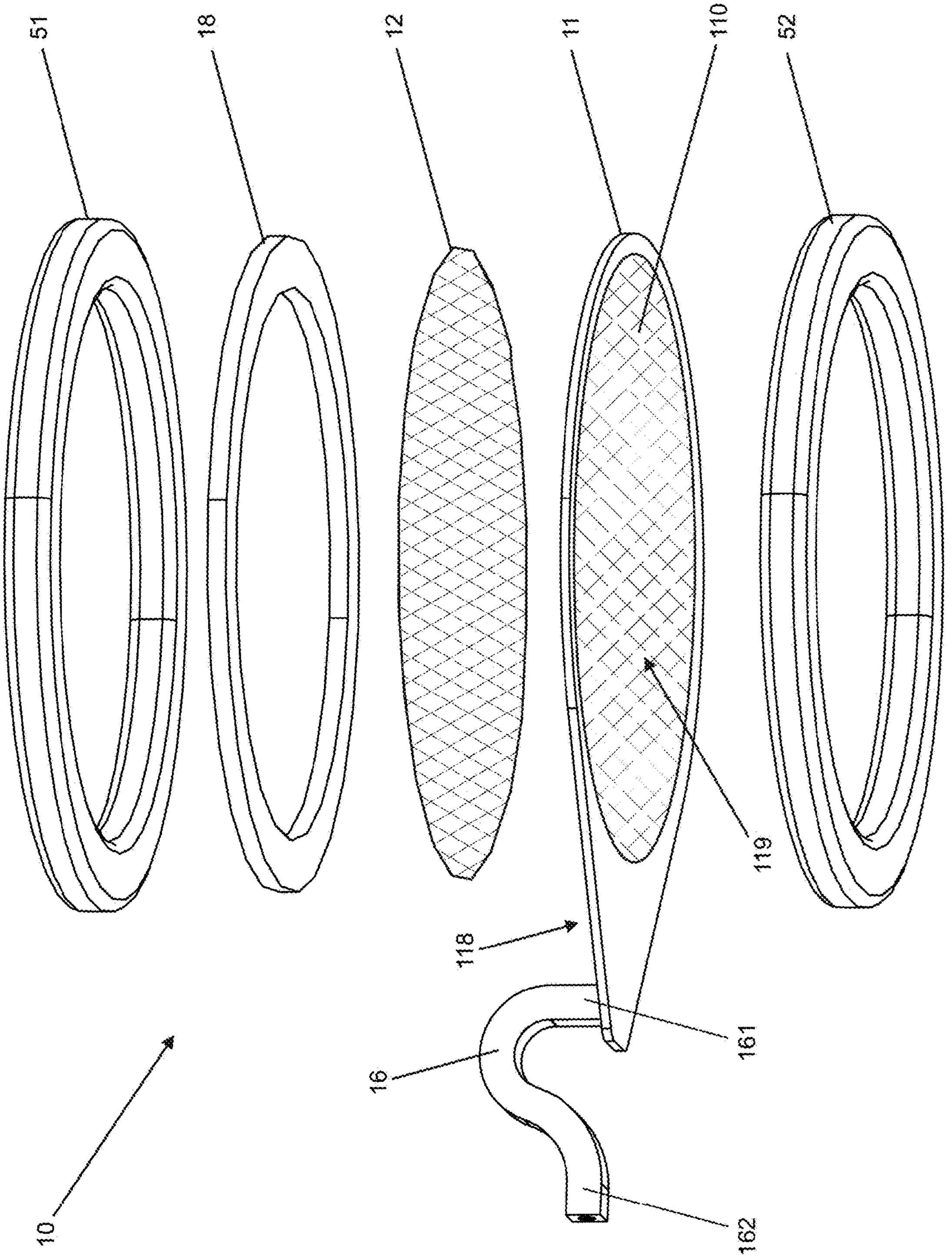
Figure 5:
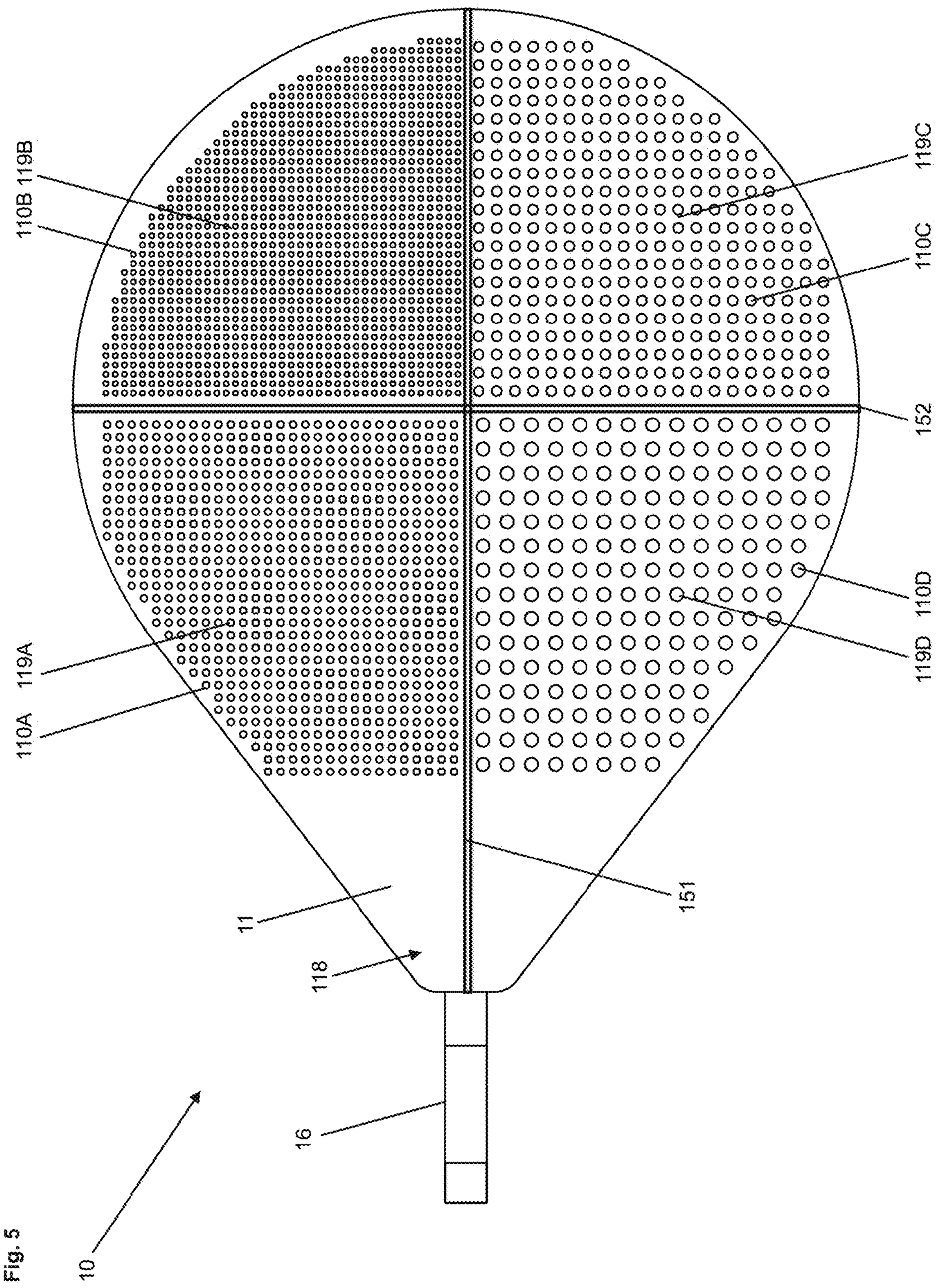
Figure 6:
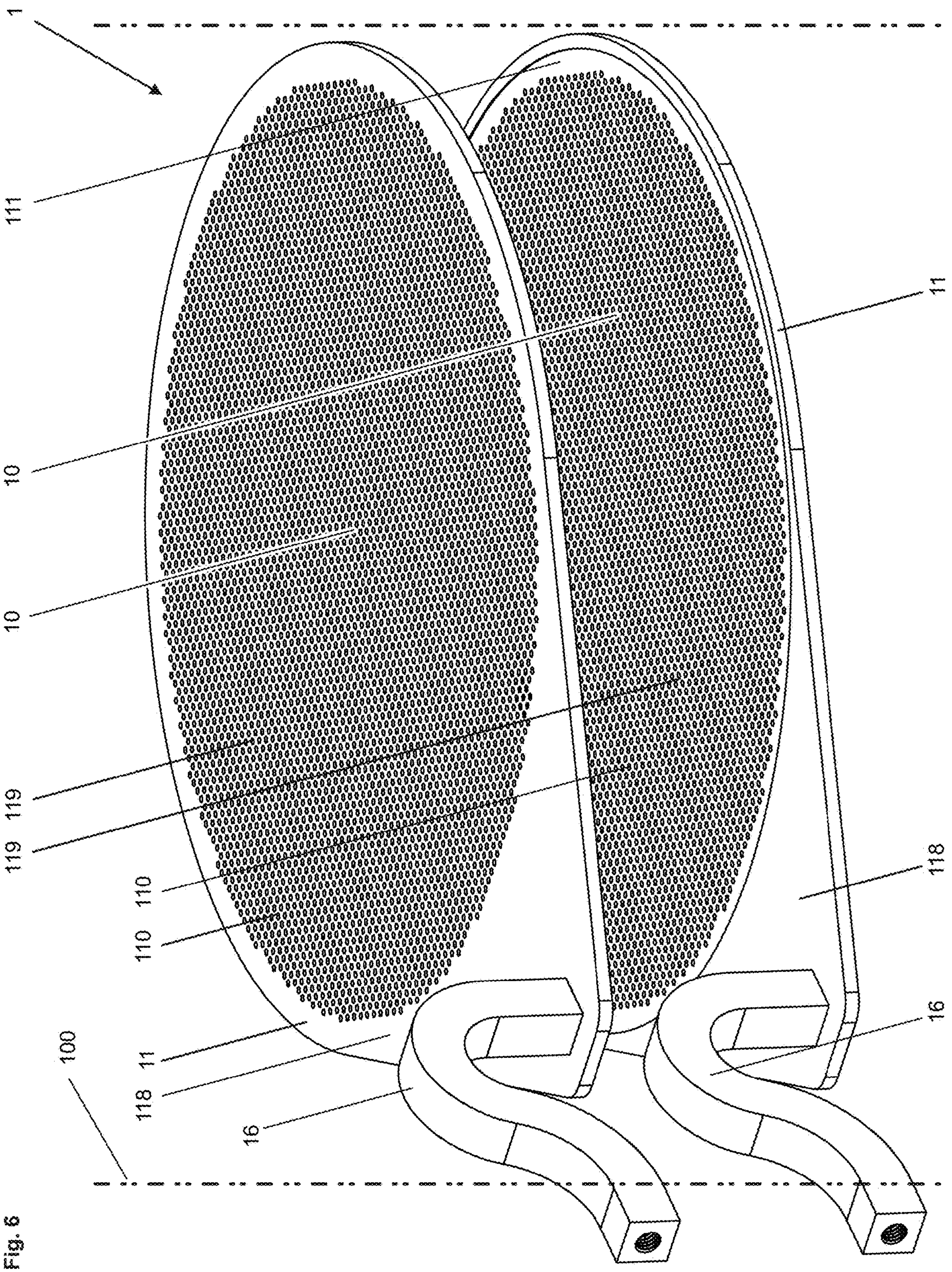
Figure 7:
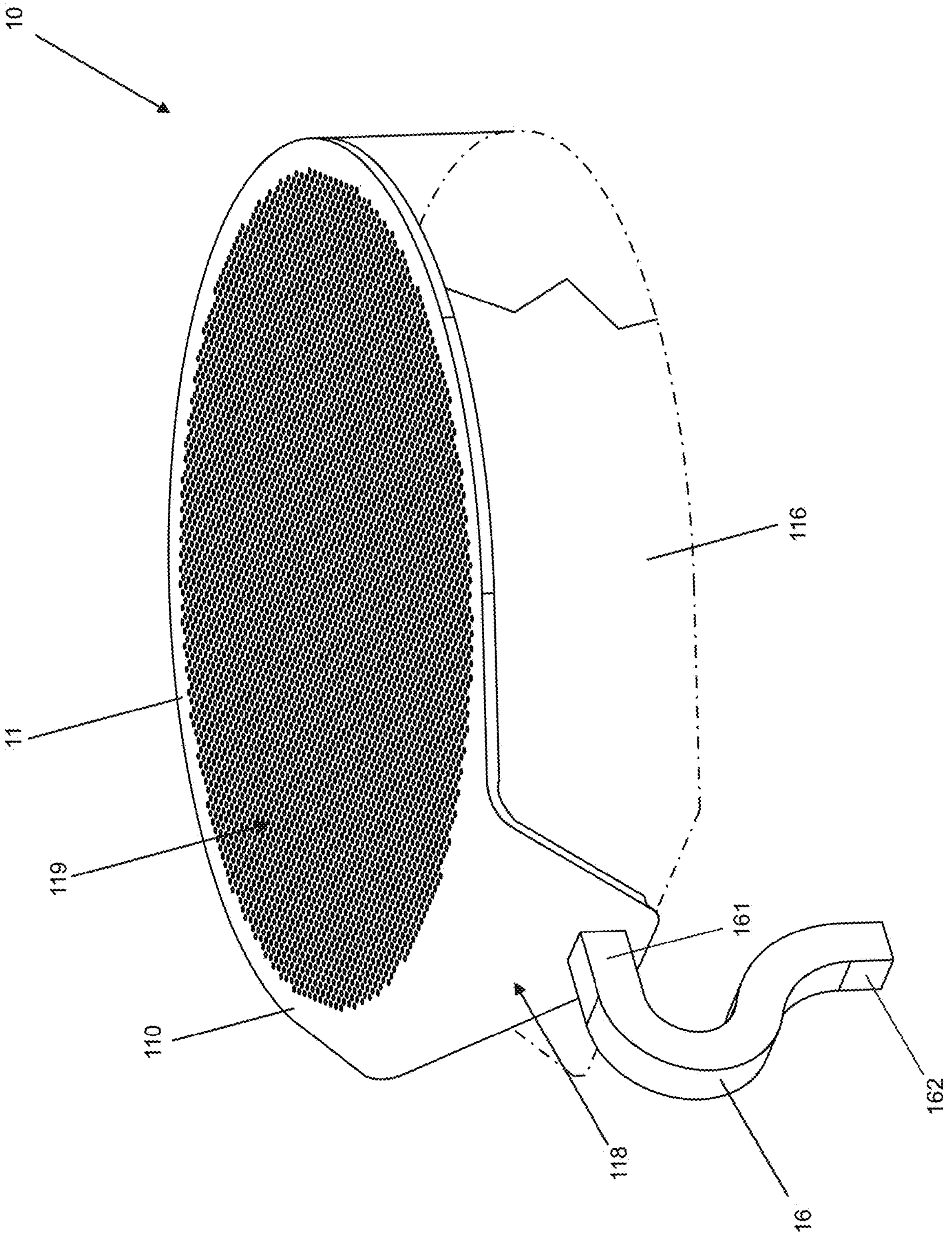
Figure 8A:
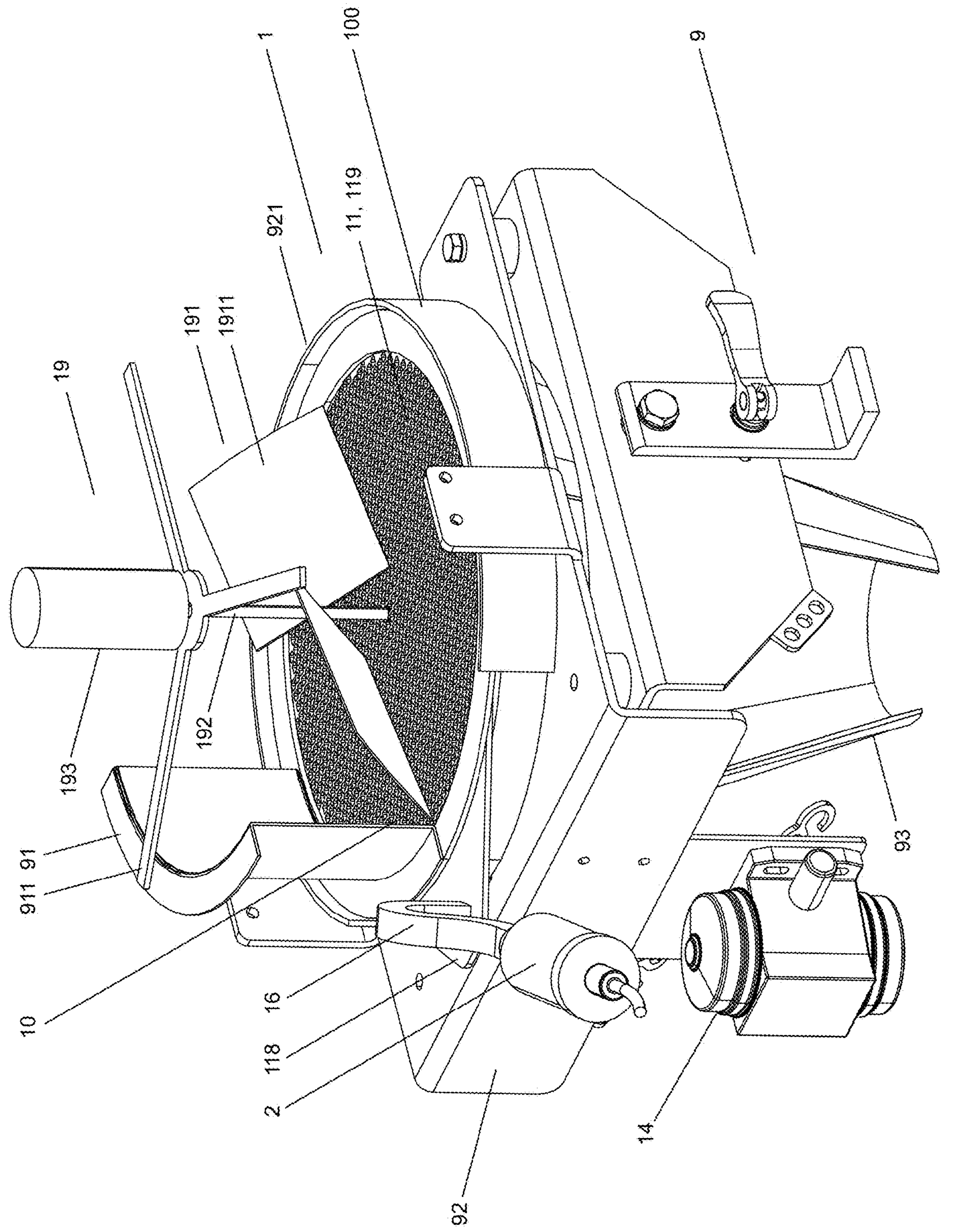
Figure 8B:
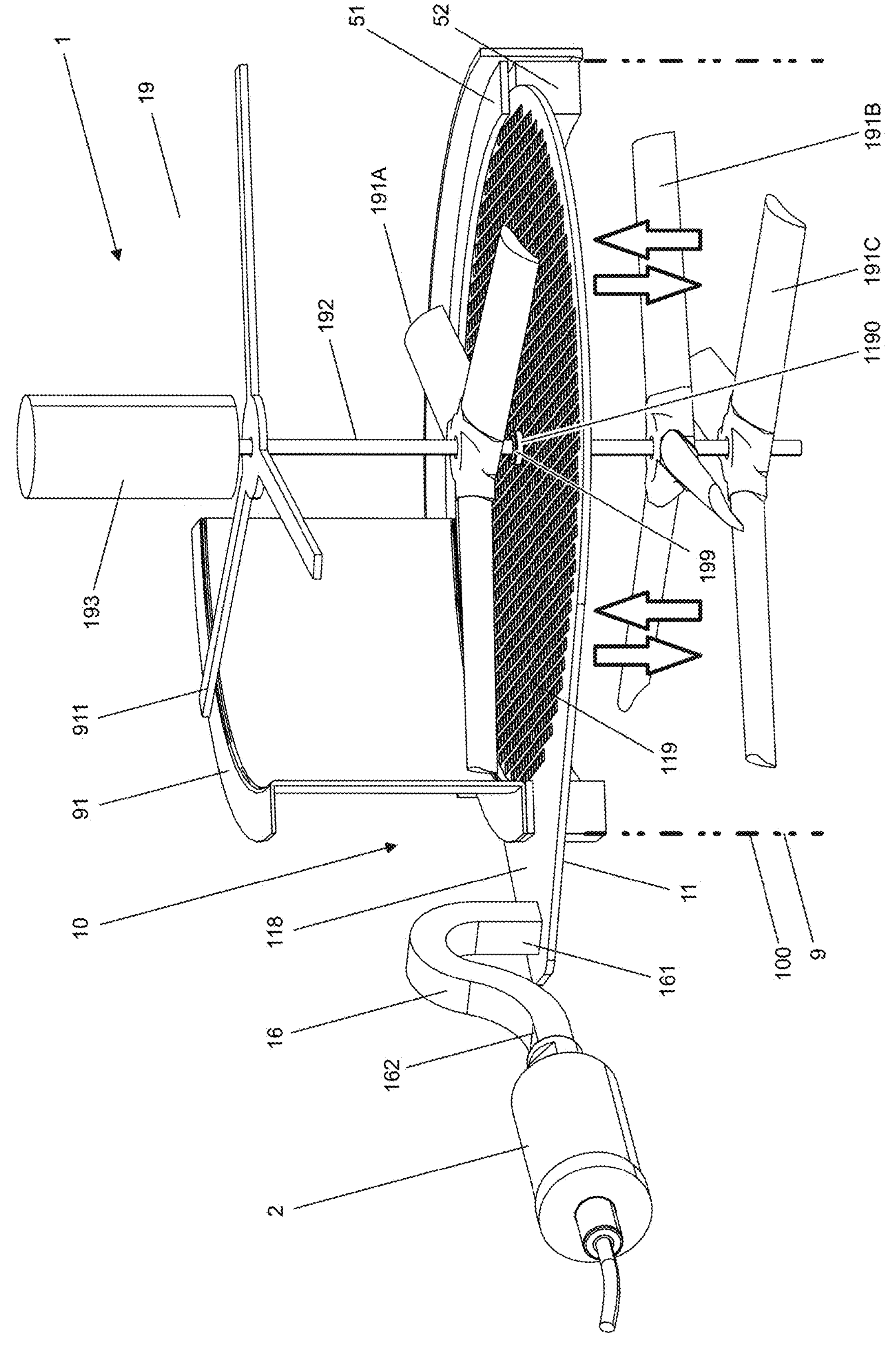

Below, the invention is explained in more detail with reference to the drawings. Thereby shows:

FIG. 1 an inventive screening device 1 which can be used for various working processes, with a screening tool 10 shown as an example, which has a work plate 11 comprising a transfer region which serves as a screen lining 119 having first transfer openings 110 and two connection regions 118, in which curved coupling elements 16 are welded, to which each ultrasonic energy can be supplied by an ultrasonic generator 3 via an ultrasonic transducer 2;

FIG. 2 the screening tool 10 of FIG. 1 in exploded view with the work plate 11 forming a first screen lining within the transfer region 119 with the first transfer openings 110, with an optional second screen lining 12 and an optional third screen lining 13 fixable to the work plate 11 by means of a mounting frame 18;

FIG. 3 in exploded view, a screening tool 10 with the work plate 11 of FIG. 2, to which, in this embodiment, the optional second screen lining 12 can be fixed on the underside and the optional third screen lining 13 can be fixed on the upper side by means of a mounting frame 18 each;

FIG. 4*a* an inventive screening tool 10 with a work plate 11, which has only one connection region 118 welded to a coupling element 16 and which can be mounted by means of pneumatic elements 51, 52 without or optionally with a further screen lining 12;

FIG. 4*b* a part of the work plate 11 of FIG. 4*a* with first transfer openings 110 of the transfer region 119, which serves as screen lining;

FIG. 4*c* the screening tool 10 of FIG. 4*a* with an optional second screen lining 12 in exploded view;

FIG. 5 a screening tool 10 according to FIG. 4*a* in a preferred embodiment with a work plate 11 with several transfer areas 119A, 119B, 119C and 119D, which have first transfer openings 110A, 110B, 110C, 110D with different dimensions and thus form different screen linings;

FIG. 6 an inventive screening device 1 with two sieving tools according to FIG. 4*a*, which are held by a schematically shown mounting structure 100;

FIG. 7 a screening tool 10 having a connection region 118 and a transfer region 119 inclined towards each other, and an adjacent wall 116, such as one of the walls of a tube or container;

FIG. 8*a* a screening device 1 comprising a screening tool 10 supported by a mounting structure 100 and connected to a working unit 19 for pre-processing a supplied process material, and comprising a rotor or propeller 191 supported by a rotor shaft 192 above the transfer region 119 of the work plate 11;

FIG. 8*b* a part of the screening device 1 of FIG. 8*a* with the preferably designed working unit 19 holding a rotor 191A above and two rotors 191B, 191C below the transfer region 119 of the work plate 11; and FIG. 8*c* the screening device 1 of FIG. 8*a* with a conveyor device 9, by means of which a process material can be supplied and removed.

FIG. 1 shows an inventive screening device 1 with a mounting structure 100, by means of which a screening tool 10 is held or several screening tools 10 arranged in series or parallel to one another are held. If several screening tools 10 are present, they can have the same or different screen linings.

By means of the screening device 1, preferably several processes for working of a screen material 61 can be carried out in process stages that are arranged parallel or serially to each other. The screening tool 10 is held or connected to the mounting structure 100 by means of mounting elements 51, 52. The mounting structure 100 and the mounting elements 51, 52 are shown schematically by dashed lines.

The mounting elements 51, 52 are preferably made entirely or partly of plastic. In a preferred embodiment, at least one pneumatic element, such as an expandable or inflatable hose or tyre, is provided as a mounting element 51, 52, by means of which the screening tool 10 can be fixed to the mounting structure 100. By means of a pneumatic element 51, the screening tool 10 can be moved towards the mounting structure 100, e.g., from above. Alternatively, two pneumatic elements 51, 52 are held by the mounting structure 100, as shown in FIG. 4*a*. By inflating the pneumatic elements 51, 52, preferably controllable by means of a control unit 8, the screening tool 10 can be fixed and released again. An exchange of the screening tool 10 can therefore easily be done within a few seconds.

By using mounting elements 51, 52 made of plastic, ultrasonic energy is prevented from being transferred from the work plate 111 to parts of the mounting structure 100.

FIG. 1 shows by way of example the screening tool 10 or one of the sieving tools 10 of the screening device 1, which has a work plate 11 with two connection regions 118 and an intermediate transfer region 119 forming a first screen lining.

A first end piece 161 of each of a bent or curved rod-shaped coupling element 16 made of metal is welded to the connection regions 118, the second end piece 162 of which is mechanically connected, for example welded or clamped, to an associated ultrasonic transducer 2.

In the ultrasonic transducers 2, preferably piezoelectrical elements are provided which are mechanically stably connected to the coupling elements 16, for example by a coupling rod which holds the piezoelectrical elements. The ultrasonic transducers 2 are supplied with an alternating voltage in the ultrasonic range by an ultrasonic generator 3 via connection lines 31 and 32, which are converted by the piezo elements of the ultrasonic transducers 2 into mechanical vibrations that are transmitted to at least one or more coupling elements 16. Due to the curved coupling elements 16, the ultrasonic energy is optimally coupled into the work plate 11 and can be evenly distributed within the one-piece work plate 11. The metal coupling element and the metal work plate 11, which are welded together, thus form a uniform medium in which the ultrasonic energy can spread unhindered. With relatively little injected ultrasonic energy, the entire work plate and the entire first screen lining can be supplied almost uniformly with ultrasonic energy.

By injecting ultrasonic energy optionally via two coupling elements 16, mechanical vibrations of correspondingly high amplitude can be transmitted to the work plate 11 without thermally or mechanically overloading it. Furthermore, the mechanical vibrations can be switched on, switched off or changed in frequency and amplitude individually for each of the coupling elements 16.

Ultrasonic energy coupled to the work plate 11 via the coupling elements 16 spreads practically without loss over the entire transfer region 119, which forms the first screen lining. If the work plate 11 and the transfer region 119 with the transfer openings 110 are adapted to the working process, the process material 61 can be optimally processed with minimal ultrasonic energy. Due to the direct and even distribution of the ultrasonic energy, no heating and no hotspots occur on the work plate 11, which could stress the screen lining or the process material 61. The screening tool 10 with the work plate 11 can therefore be operated with maximum efficiency and without signs of wear.

The ultrasonic generator 3 is controlled by a control unit 8 via a control line 81. By appropriate control of the ultrasonic generators 3, electrical alternating voltage signals in the ultrasonic range with selected frequency and amplitude can be transmitted, preferably selectively, via the lines 31, 32 to the connected ultrasonic transducers 2 of one or more sieving tools 10. Preferably, ultrasonic energy can be supplied to each screening tool 10 at a selectable level and/or frequency. Further preferably, a screening tool 10, which is connected to the ultrasonic generator 3 via two or more coupling elements 16 and ultrasonic transducer 2, can be supplied individually with ultrasonic energy at a selectable level and/or frequency via each of the ultrasonic transducers 2.

In this way, the behaviour of the screening tools 10 within a screening device 1 can be individually controlled. The throughput of the process material through a screening tool 10 can be increased or reduced, so that it is possible to dispense a process material in a dosed manner or to mix different components of a process material and, if necessary, dispense them in a dosed manner.

If the screening device 1 is equipped with several sieving tools 10, then sieving tools 10 can be arranged in series or parallel to each other. The process material can therefore pass through several sieving tools 10 in series. A process material or several process materials can also pass through the screening device 1 in parallel. Furthermore, it is possible that some of the sieving tools 10 are arranged in series and other sieving tools 10 are arranged in parallel.

The frequency of the signals emitted by the ultrasonic generator 3 can preferably be shifted or keyed to avoid standing waves within the work plate 11. By varying the impact of ultrasonic energy from both sides of the work plate 11 via the coupling elements 16, it is also possible to act on the process material 61 to move it and preferably distribute it evenly. For monitoring the working process and preferably also the process material 61, at least one sensor 7, for example a camera, is preferably provided, the signals of which are transmitted via the measuring line 82 to the control unit 8. The control unit 8 can therefore control the delivery of ultrasonic energy to the two coupling elements 16 on the basis of the evaluation of the sensor signals. By means of the control unit 8, a process for dosing process material can also be controlled. For example, the transfer openings 110, 120, 130 of a screen lining 11, 12, 13 are filled with process material during a period in which no ultrasonic energy is injected. Subsequently, ultrasonic energy is supplied and the transfer openings 110, 120, 130 are emptied.

The process material 61 can be processed in various ways. For example, the process material 61 is passed through the work plate 11 of the screening tool 11 and screened and delivered to a receiving container 4 or to a conveyor belt 40. The processed process material 62 can also be further processed in other process steps. The process material 61 can, for example, be processed above the screening tool 10 by feeding media 71, 72 without passing through the work plate 11. Instead, at least one medium 71, such as air, gas or steam, can be passed through the work plate 11 to treat or impinge on the process material 61 or the separated particles of the process material 61. For example, air 71 with a certain temperature is passed through the work plate 11 to swirl it and a steam or mist 72 is blown in from above to impinge on the particles of the process material 61. The processed process material 62 can then be removed above the work plate 11.

In the embodiment shown, the work plate 11 is optionally provided with a second screen lining 12, which has second transfer openings 120. The first screen lining of the work plate 11, which is formed by the transfer region 119 and first transfer openings 110, is therefore hardly visible. Typically, a second screen lining 12 is mounted to achieve a combined screen lining with reduced transfer openings.

The second screen lining 12 is peripherally held by a mounting frame 18, which is connected to the work plate 11 by means of mounting screws 181. By means of the mounting frame 18, the second screen lining 12 is only to be held and pressed against the work plate 11, which is why the mounting frame 18 and the mounting screws 181 are preferably made of plastic and thus do not absorb ultrasonic energy. FIG. 2 shows the screening tool 10 of FIG. 1 in an exploded view with the one-piece work plate 11. The rectangular transfer region 119 lying between the connection regions 118 has rows of holes with transfer openings 110 and is slightly countersunk into the work plate 11. The transfer openings 110 are shown enlarged and have a diameter adapted to the process material, which is in the range of a few microns for a powdery process material and in the range of 1-2 mm or higher for other process materials.

The work plate 11 or the transfer region 119 together with the transfer openings 110 form the first screen lining, which by itself can be sufficient for the processing of a process material 61 and is adapted to the process material 61. For this purpose, the transfer region 119 can be provided with any number of transfer openings 110 with dimensions selected as required. The transfer openings 110 are preferably arranged equidistantly on a correspondingly provided surface. This surface may be regular or irregular as required by the user and may comprise e.g., several wings, circles, rectangles or the like to form any screen lining. The work plate 11 is preferably adapted to the infrastructure of a process plant, e.g., to pipes or ducts, and can also have any regular or irregular shape, e.g., rectangular or circular.

The transfer openings 110 can be worked into the work plate 11 in any way, e.g., by mechanical tools or laser devices. If the work plate 11 is relatively thin in the transfer region 119, openings are preferably punched in or inserted by laser beams.

As FIG. 1 shows, any straight or curved coupling elements 16 can be connected to the connection regions 118 of the work plate 11.

As FIG. 2 shows, the transfer region 119 can optionally be covered with a second screen lining 12 or further optional screen linings, e.g., a third screen lining 13. The choice of a second or further screen lining 12, 13 allows the screening tool 10 to be adapted to any process material 61. The optional additional screen linings 12, 13 are preferably made of metal.

As shown in FIG. 2, the additional screen linings 12, 13 can be very thin and thus particularly easy to manufacture. The screen linings 12, 13 can be easily mounted and also quickly and easily replaced.

Since the ultrasonic energy is evenly distributed over the entire work plate 11, the ultrasonic energy is also evenly transmitted to the additional screen linings 12, 13. In the central area of the second screen lining 12 or the additional screen linings 12, 13, these are pressed against the work plate 11 by the process material 61, so that an optimal and even coupling of ultrasonic energy also takes place in this area. The other screen linings 12, 13 are therefore not only mechanically protected by the adjacent work plate 11, but also thermally protected against unwanted influences. The work plate 11 also acts as a heat sink in case the screen linings 12, 13 heat up. The work plate 11 therefore also ensures optimum operation of the additional screen lining 12 or the additional screen linings 12, 13.

The transfer region 119 is preferably slightly recessed and enclosed by a circumferential mounting channel or a circumferential indentation 111, which serves to receive the mounting frame 18.

Within the mounting channel 111, a circumferential forming element 112, in this embodiment a circumferential groove, is provided, into which a corresponding formed counter element 122; 132 is insertable, which is provided on the at least one optional second screen lining. There can also be several form elements 112 or parts of form elements 112 that allow the second screen lining 12 to be moved relative to the work plate 11 or that allow the second and third screen linings 12, 13 to be moved relative to each other.

In the embodiment of FIG. 2, the second screen lining 12 and the third screen lining 13 comprise second and third transfer openings 120, 130, respectively, which have different dimensions. Identical second and third or further screen linings 12, 13 can also be provided, which can be moved against each other to close the transfer openings 120, 130 as required.

FIG. 3 shows an exploded view of a screening tool 10 with the work plate 11 of FIG. 2, to which in this embodiment the optional second screen lining 12 of FIG. 2 can be fixed on the underside and the optional third screen lining 13 of FIG. 2 can be fixed on the top by means of a mounting frame 18 in each case. The work plate 11 can therefore be used without additional screen linings 12, 13 or can be fitted with identical or different screen linings 12, 13 of any number on the underside and top side.

FIG. 4*a* shows a screening device 1 with an inventive screening tool 10, which has only one connection region 118 welded to a coupling element 16 and which is mountable by means of pneumatic elements 51, 52. The transfer region 119 adjacent to the connection region 118 is circular and held between two tyre-shaped pneumatic elements 51, 52, which are held by the mounting structure 100. To remove the screening tool 10, the pneumatic elements 51, 52 are evacuated. To fix the screening tool 10, the pneumatic elements 51, 52 are inflated again. At the same time, the mounting ring 18 shown can be pressed against the work plate 11 to fix at least one optionally provided screen lining 12. The screening tool 10 and/or the optional screen lining can therefore be replaced within a short time in order to adapt to a process change.

FIG. 4*b* shows a part of the transfer region 119 of the work plate 11 of FIG. 4*a* with first transfer openings 110.

FIG. 4*c* shows an exploded view of the screening tool 10 of FIG. 4*a*. The optional second screen lining 12 is located on the top of the work plate 11.

FIG. 5 shows the screening tool 10 according to FIG. 4*a* in a preferred embodiment with a work plate 11 with several transfer regions 119A, 119B, 119C and 119D, which have first transfer openings 110A, 110B, 110C, 110D with different dimensions. The individual transfer regions 119A, 119B, 119C and 119D are separated from each other by partition walls 151, 152, so that different screening processes can be carried out in four quadrants with the same screening tool 10. The screening processes can be independent of each other or optionally linked to each other. The transfer areas 119A, 119B, 119C and 119D can also be arranged on differently shaped surfaces, e.g., rectangular or circular surfaces, so that pipes or containers with a corresponding cross-section can be connected.

FIG. 6 shows a screening device 1 with two sieving tools 10 according to FIG. 4*a*, which in combination form a two-stage screening tool 100. Instead, two or more sieving tools according to FIG. 1 or FIG. 5 could also be combined and mechanically coupled. The transfer region 119 of the lower screening tool 10 is lowered in relation to the connection region 118, so that an optional second screen lining 12 can be easily inserted. The mounting structure 100, by means of which the two screening tools 10 are held, is shown schematically by dashed lines.

FIG. 7 shows a screening tool 10 with a connection region 118 and a transfer region 119, which are inclined towards each other. The connection region 118 is adjoined by a wall 116, such as the wall of a tube or container. For example, the connection region 118 is modular or integral with the wall 116.

FIG. 8*a* shows a screening device 1 with a screening tool 10 arranged in a mounting structure 100.

The screening tool 10 is supported by a holder 92 and partially enclosed by a retaining ring 921. Above the transfer region 119, a cup-shaped entrance channel 91 shown in sectional view is arranged which encloses the transfer region 119 and into which one or more different process materials are introduced. Part of the entry channel 91 has been cut away to expose the screening tool 10. Below the transfer region 119, a funnel-shaped exit channel 93 connects to the work plate 11, a quarter of which has also been cut away. A process material can therefore be fed to the screening tool 10 through the input channel 91 and removed through the output channel 93. The cup-shaped input channel 91 and the funnel-shaped output channel 93 form the guiding device 9.

In this preferred embodiment, the screening tool 10 is optionally connected with a working unit 19, which serves for the pre-processing of a supplied process material. A rotor shaft 192 is guided through the work plate 11 of the screening tool 10 in the transfer region 119, which is driven by a drive motor 193 and which drives a rotor 191 with two rotor blades 1911. During rotation of the rotors 191, the fed process material is evenly distributed above the transfer region 119 and, if necessary, pressed against the work plate 11.

The work plate 11 can therefore advantageously be used to hold at least a part of the working unit 19, which is why the screening tool 10 and the working unit 19 can advantageously be combined and/or connected with each other.

Optionally, a vibrator 14 is provided which is connected to the mounting structure 100 and which transmits mechanical vibrations to the screening tool 10. The screening tool 10 and the process material are thus affected by ultrasonic waves from the ultrasonic transducer 2, optionally mechanical vibrations of the vibrator 14 and optionally air movements caused by the rotor 191.

FIG. 8*b* shows a part of the screening device 1 of FIG. 8*a* with the preferably designed working unit 19 with a rotor shaft 192, which holds a rotor 191A above and two rotors 191B, 191C below the transfer region 119 of the work plate 11. The rotor shaft 192 is held in a mounting part 199, which is designed as a bearing bush. The bearing bush 199 is inserted into a bearing opening 1190 in the middle of the transfer region 119 of the work plate 11. The two rotors 191B, 191C below the work plate 11 can work in the same direction or in opposite direction so that, for example, a process material is sucked in and/or swirled, as symbolized by two arrows.

Furthermore, it is possible to arrange separate working units 19 below and above the work plate 11. The work plate 11 therefore serves not only as a tool plate, but also as a base plate for the assembly of additional working units 19. This allows a simple and compact assembly of the screening tool and further working units 19.

The screening tool 10 is held between two ring-shaped mounting elements 51, 52, which are connected to the mounting structure 100. The mounting structure 100 may for example be a tube, which may serve as a functional element of the conveyor device 9. The mounting structure 100 may also be a skeletal structure consisting of, for example, columns and/or rods that are connected to each other.

Figure 8C:
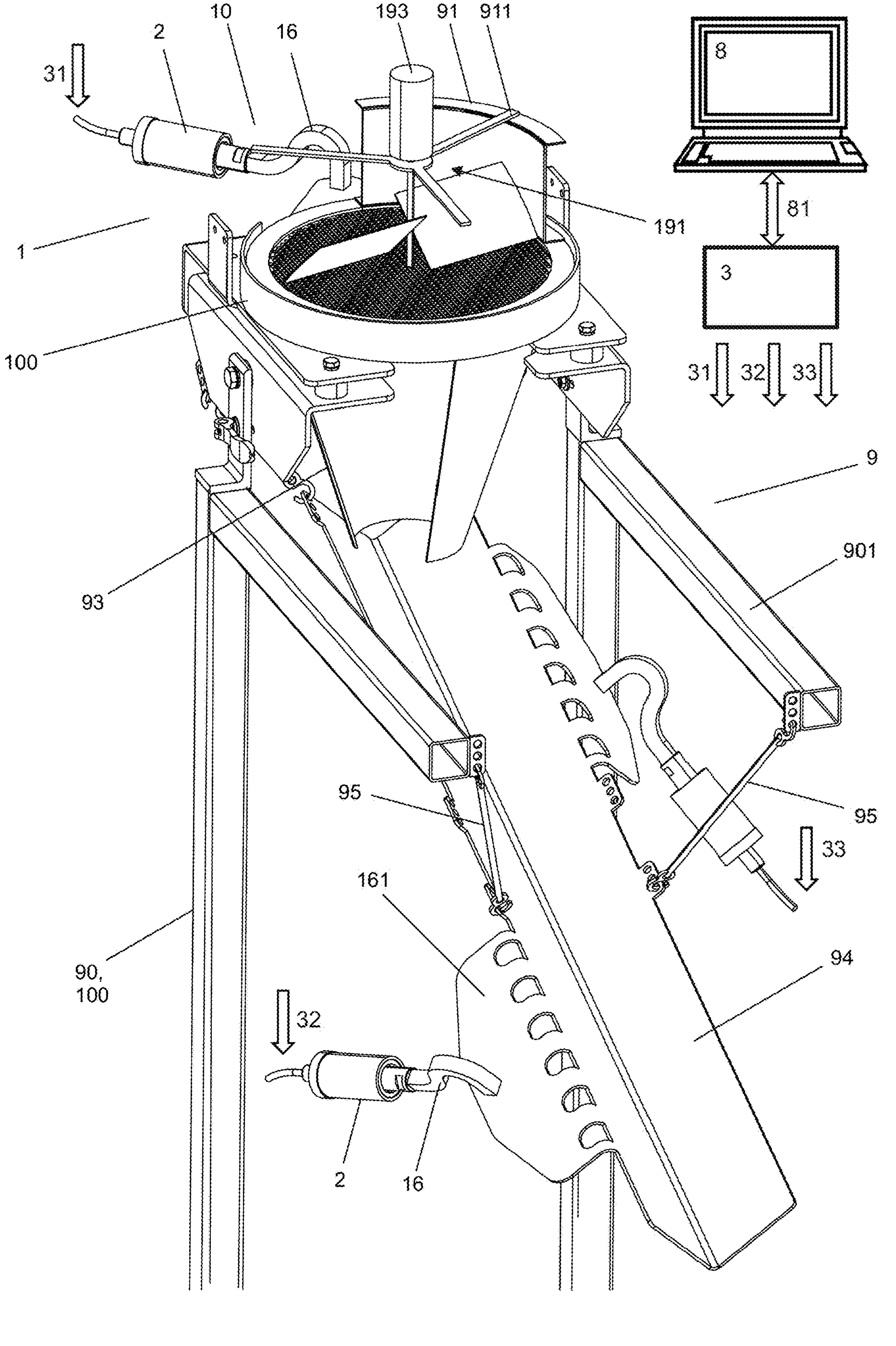

FIG. 8*c* shows the screening device 1 of FIG. 8*a* arranged on a frame 90 with a mounting structure 100 and a conveyor device 9 by means of which the process material can be fed in and removed. As mentioned, the elements of the mounting structure 100 can also be elements of the conveyor device 9.

The conveyor device 9 comprises the input channel 91 and the output channel 93 as well as a transport device 94, which is suspended below the output channel 93 by elastic cables 95. The transport device 94 is designed as a transport frame or conveyor channel with a V-profile that is open at the top.

The transport frame 94 is connected via distribution plates 161, preferably curved, rod-shaped coupling elements 16 and ultrasonic transducer 2 with an ultrasonic generator 3, through which ultrasonic energy can be transmitted to the metal transport frame 94.

The ultrasonic generator 3 of FIG. 1 and FIG. 8*c* generates electrical AC voltage signals in the ultrasonic range of e.g., 25 kHz to 45 kHz. The alternating voltage signals are supplied in the ultrasonic transducer 2, e.g., to piezo elements which are firmly connected to the coupling rod 16, e.g., by a coupling bar. The AC voltage signals are converted into mechanical vibrations by the piezo elements and transmitted to the transport frame 94 via the coupling rod 16 and the distribution plate 161.

The distribution plate 161 may be welded to the transport frame 94 or, as shown in FIG. 8*c*, integrally connected.

Due to the coupling via the coupling rod 16 and the distribution plate 161, the ultrasonic energy is not coupled point by point, but along the connection side of the distribution plate 161 into the transport frame 94. Problems resulting from the conventional point coupling of the ultrasonic energy, such as overheating and material stresses which could destroy the connection point, are avoided. The ultrasonic energy is coupled into the transport frame 94 over a larger area, which on the one hand reduces coupling losses and on the other hand achieves an optimal distribution and effect of the ultrasonic energy in the transport frame 94. The shown one-piece connection of the distribution plates 161 with the transport frame 94 is particularly advantageous. Overall, the manufacturing effort is reduced since the transport frame 94 and the distribution plate 161 can be manufactured in one work step. Welding of the distribution plates 161 is no longer necessary. Likewise, transition resistances and material stresses at the welded joints are eliminated. Furthermore, thermal loads on the joints are eliminated, as the thermal energy can be distributed more quickly, so that optimum operating conditions are always present. Similarly, the distribution plates 161 prevent unfavourable reactions from the process material to the ultrasonic device, in particular the ultrasonic transducer 2, which could occur if the coupling rods 16 were connected at points. For example, if the process material has a temperature in the range of 200°, the distribution plates 161 will cool the ultrasonic transducer 2 considerably and thus reduce the heat effect on the ultrasonic transducer 2.

The elastic ropes 95 keep the transport frame 94 practically suspended. An outflow of coupled ultrasonic energy via parts of the device is avoided. The ultrasonic energy can be evenly distributed over the transport frame 94 and develop an optimal effect. The process material can advantageously slide down the inclined transport frame 94 in a distributed and friction-free manner. The conveying speed of the process material can be controlled by controlling the supply of ultrasonic energy so that a metered delivery can take place.

The invention claimed is:

1. A screening tool for working a process material with at least one first screen lining, which is coupled to a metal coupling element, to which an ultrasonic transducer is connected, which is connected by electrical lines to an ultrasonic generator, the screening tool comprising a metal work plate which comprises a connection region and at least one first transfer region with first transfer openings, the connection region and the at least one transfer region being integrally formed with the metal work plate, wherein the which first transfer region forms the first screen lining, by which particles of the process material which are larger than the first transfer openings are separable from particles of the process material which are smaller than the first transfer openings, wherein the coupling element is a curved or straight rod, which comprises a first end piece welded to the connection region, and a second end piece mechanically connected to the ultrasonic transducer.

2. The screening tool according to claim 1, wherein the connection region is inclined with respect to the first transfer region and lies free or adjoins a wall of a container or a wall of a pipe.

3. The screening tool according to claim 1, wherein the least one first transfer region integrally formed with the metal work plate comprises a plurality of transfer regions each forming a screen lining and each provided with transfer openings, wherein the transfer openings of at least two of the transfer regions have equal or different dimensions.

4. The screening tool according to claim 3, wherein the transfer regions are completely or partially separated from each other by separating elements.

5. The screening device according to claim 4, wherein the separating elements are walls or tubes.

6. The screening tool according to claim 1, wherein the metal work plate comprises a plurality of connection regions and a plurality of coupling elements, which coupling elements each comprise a first end piece welded to the associated connection region and a second end piece mechanically connected to the associated ultrasonic transducer.

7. The screening tool according to claim 1, wherein above or below, or above and below the first transfer region of the metal work plate at least one second screen lining with second transfer openings is arranged and connected to the metal work plate by mounting elements.

8. A screening device with a mounting structure, by which at least one screening tool according to claim 1 is held, wherein the ultrasonic transducer is connected by the electrical lines to the ultrasonic generator.

9. The screening device according to claim 8, wherein the metal work plate of the at least one screening tool has a plurality of connection regions, each welded to the first end piece of an associated coupling element, the second end piece of which is mechanically connected to an associated ultrasonic transducer, which is connected by electrical lines to the ultrasonic generator.

10. The screening device according to claim 8, wherein the metal work plate of the screening tool comprises at least one mounting part, by means of which at least one motorised or non-motorised working unit, which serves for additional processing, of the process material, is held.

11. The screening device according to claim 10, wherein the at least one mounting part is a bearing opening or bearing bush provided in the metal work plate and that the working unit comprises a rotor shaft which is rotatably held in the mounting part and which holds above or below or above and below the metal work plate, at least one rotor.

12. The screening device according to claim 10, wherein a control unit is provided, by means of which the ultrasonic generator is controllable in such a way that ultrasonic energy of selected level and selected frequency can be transmitted jointly or individually to the connected ultrasonic transducers of the installed screening tool or the installed screening tools.

13. The screening device according to claim 8, wherein above or below, or above and below the metal work plate of the at least one screening tool, at least one second screen lining with second transfer openings is adjacent.

14. The screening device according to claim 8, wherein the metal work plate of the at least one screening tool comprises a plurality of transfer regions with transfer openings which transfer regions each form a screen lining.

15. The screening device according to claim 14, wherein the transfer regions are separated from each other by at least one separating element which includes a tube, or a separating element which includes a tube or a container, adjoins the first transfer region or one or more of the transfer regions below or above the metal work plate.

16. The screening device according to claim 8, wherein the at least one screening tool or the at least one screening tool and the at least one second screen lining is fixed to the mounting structure by mechanical mounting elements or by at least one pneumatically actuable mounting element which includes hose or a tyre.

17. The screening tool according to claim 1, wherein the least one first transfer region integrally formed with the metal work plate comprises a plurality of transfer regions each forming a screen lining and each provided with transfer openings, wherein the transfer openings of at least two of the transfer regions have different dimensions.

* * * * *